United States Patent
Hague et al.

(12) 
(10) Patent No.: US 11,996,784 B2
(45) Date of Patent: May 28, 2024

(54) VOLTAGE CONVERTER

(71) Applicant: STMicroelectronics (Tours) SAS, Tours (FR)

(72) Inventors: Yannick Hague, Mettray (FR); Romain Launois, Tours (FR)

(73) Assignee: STMicroelectronics (Tours) SAS, Tours (FR)

(*) Notice: Subject to any disclaimer, the term of this patent is extended or adjusted under 35 U.S.C. 154(b) by 323 days.

(21) Appl. No.: 17/532,717

(22) Filed: Nov. 22, 2021

(65) Prior Publication Data

US 2022/0166340 A1 May 26, 2022

(30) Foreign Application Priority Data

Nov. 26, 2020 (FR) ...................................... 2012211

(51) Int. Cl.
*H02M 7/06* (2006.01)
*H02M 1/32* (2007.01)
*H02M 1/36* (2007.01)

(52) U.S. Cl.
CPC ........... *H02M 7/062* (2013.01); *H02M 1/322* (2021.05); *H02M 1/36* (2013.01)

(58) Field of Classification Search
CPC ....... H02M 1/322; H02M 1/36; H02M 1/7062
See application file for complete search history.

(56) References Cited

U.S. PATENT DOCUMENTS

| | | | |
|---|---|---|---|
| 4,573,113 A | 2/1986 | Bauman | |
| 5,563,758 A * | 10/1996 | Dembrosky | H02H 3/24 361/111 |
| 2017/0373491 A1 * | 12/2017 | Schork | H02H 9/044 |

FOREIGN PATENT DOCUMENTS

| | | |
|---|---|---|
| CN | 105515412 B | 5/2018 |
| JP | 2013031335 A | 2/2013 |

OTHER PUBLICATIONS

INPI Search Report and Written Opinion for priority application, FR Appl. 2012211, report dated Jul. 22, 2021 (9 pages).
ST: "AN5114—Application Note", 31 juillet 2020 (Jul. 31, 2020), XP055827043.

* cited by examiner

*Primary Examiner* — Jue Zhang
(74) *Attorney, Agent, or Firm* — Crowe & Dunlevy LLC

(57) ABSTRACT

A voltage converter delivers an output voltage between a first and a second node. The voltage converter includes a capacitor series-coupled with a resistor between the first and second nodes. The resistor is coupled in parallel with a bidirectional switch receiving at its control terminal a positive bias voltage referenced to the second node.

10 Claims, 3 Drawing Sheets

VOLTAGE CONVERTER

PRIORITY CLAIM

This application claims the priority benefit of French Application for Patent No. 2012211, filed on Nov. 26, 2020, the content of which is hereby incorporated by reference in its entirety to the maximum extent allowable by law.

TECHNICAL FIELD

The present disclosure relates generally to electronic devices, and, more specifically, to AC/DC converters. The present disclosure generally applies to any circuit using a rectifying bridge as an AC/DC converter.

BACKGROUND

Many AC/DC converter architectures, based on controllable rectifying elements, for example, thyristors (or SCRs, for Silicon Controlled Rectifiers), or non-controllable rectifying elements, such as diodes assembled as a rectifying bridge, powered with an AC voltage and delivering a DC voltage, are known.

The inrush current, that is, the current peaks which occur on each halfwave of the AC voltage as long as the voltage across a capacitor at the output of the rectifying bridge has not reached a sufficient level, particularly in starting phases, is generally desired to be limited.

There is a need in the art to overcome all or part of the disadvantages of known voltage converters.

SUMMARY

One embodiment provides a voltage converter delivering an output voltage between a first node and a second node, the voltage converter being or including a capacitor series-coupled with a resistor between the first and second nodes, the resistor being coupled in parallel to a bidirectional switch receiving at its control terminal a positive bias voltage referenced to the second node.

According to an embodiment, the converter may include a voltage rectifying bridge.

According to an embodiment, a control current is injected into the control terminal and, for a first value of the control current, the switch blocks flow of a positive current from the first node to the second node. For a second value of the control current, the switch allows flow of a positive current from the first node to the second node.

According to an embodiment, the flow of a negative current from the second node to the first node is independent from the control current.

According to an embodiment, the switch may be or include a diode having its cathode coupled to the first node and having its anode coupled to the second node.

According to an embodiment, the switch may be or include a thyristor having its cathode coupled to the second node and having its anode coupled to the first node, the thyristor receiving the bias voltage on its gate, the control current being injected into the gate.

According to an embodiment, the switch may be or include a transient voltage suppressor circuit coupled between the anode of the thyristor and the gate of the thyristor.

According to an embodiment, the switch may be or include a first triac, the first anode of the first triac being coupled to the first node and the second anode of the first triac being coupled to the second node.

According to an embodiment, the switch may be or include a second triac coupled between the gate of the first triac and the second node, the second triac being controlled by the control current.

According to an embodiment, a first anode of the second triac is coupled to the second node and a second anode of the second triac is coupled to the gate of the first triac.

According to an embodiment, the switch may be or include a transient voltage suppressor circuit coupled between the gate of the first triac and the second node.

According to an embodiment, the transient voltage suppressor circuit may be a transil diode.

Also disclosed herein is a voltage converter including: a rectifying bridge having first and second outputs directly electrically connected to first and second nodes, wherein an input voltage is received between first and second inputs of the rectifying bridge; a capacitance directly electrically connected between the first node and a third node; a resistance directly electrically connected between the third node and the second node; and a bidirectional switch directly electrically connected between the third node and the second node, the bidirectional switch having a control terminal, wherein the control terminal receives a control signal.

The bidirectional switch may include: a first triac having a first anode directly electrically connected to the third node and a second anode directly electrically connected to the second node, the first triac further having a gate directly electrically connected to a fourth node; and a second triac having a first anode directly electrically connected to the gate of the first triac, a second anode directly electrically connected to the second node, the second triac having a gate receiving the control signal.

A transient voltage suppressor circuit may be directly electrically connected between the fourth node and the second node.

The transient voltage suppressor circuit may be a transil diode.

The bidirectional switch may include: a diode having a cathode directly electrically connected to the third node and an anode directly electrically connected to the second node; and a thyristor having an anode directly electrically connected to the third node, a cathode directly electrically connected to the second node, and a gate directly electrically connected to a fourth node, wherein the gate receives the control signal.

A transient voltage suppressor circuit may be directly electrically connected between the third node and the fourth node.

The transient voltage suppressor circuit may be a transil diode.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, the steps and elements that are useful for an understanding of the embodiments described herein have been illustrated and described in detail. In particular, the various possible applications of the embodiments of voltage converters are not detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
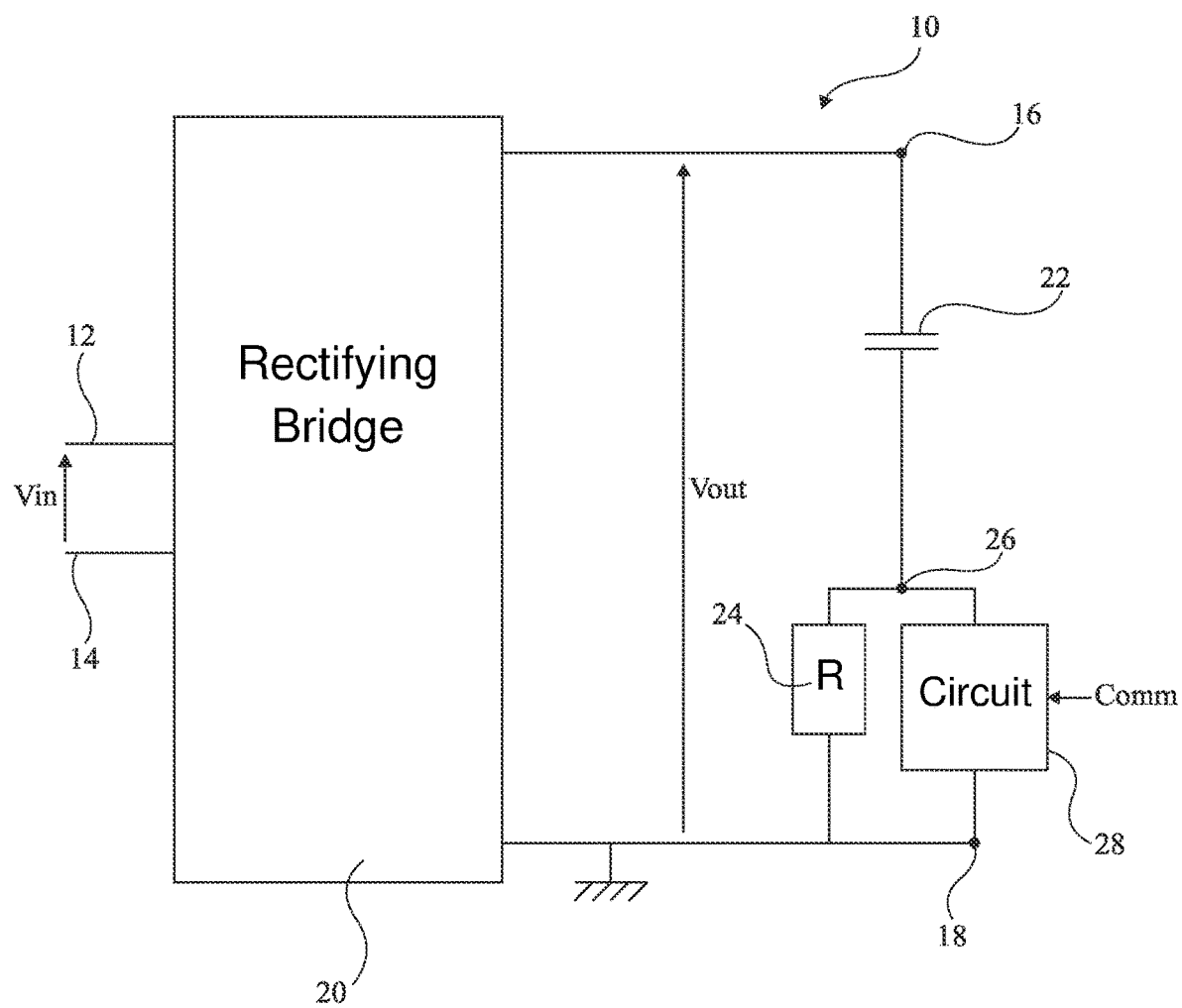
FIG. 1 schematically shows an embodiment of a voltage converter disclosed herein.

FIG. 1 schematically shows an embodiment of a voltage converter 10.

Voltage converter 10 receives, as an input, a voltage Vin. In other words, converter 10 comprises two input nodes 12 and 14, with voltage Vin being delivered between nodes 12 and 14. Input nodes 12 and 14 are, for example, coupled across an AC voltage source (not shown) which may be, for example, an electric power distribution system.

Converter 10 outputs an output voltage Vout. Voltage Vout is, for example, a DC voltage. Voltage Vout is delivered between two nodes 16 and 18. Node 18 corresponds to a reference potential, for example, ground. Voltage Vout is referenced to the reference potential on node 18.

Converter 10 comprises a circuit 20 receiving voltage Vin and delivering voltage Vout. Circuit 20 is coupled, preferably connected, to input nodes 12 and 14 and to output nodes 16 and 18. Circuit 20 comprises a rectifying bridge, details of which are not shown in FIG. 1.

Converter 10 comprises a capacitor 22 and a resistor (R) 24 series-coupled between output nodes 16 and 18. More particularly, one of the terminals of capacitor 22 is coupled, preferably connected, to node 16. A second terminal of the capacitor is coupled, preferably connected, to a node 26. A terminal of resistor 24 is coupled, preferably connected, to node 26. The other terminal of resistor 24 is coupled, preferably connected, to node 18.

Converter 10 further comprises a circuit 28. A terminal of circuit 28 is coupled, preferably connected, to node 26. Another terminal of circuit 28 is coupled, preferably connected, to node 18. Circuit 28 comprises a control input or terminal. The control input receives a control signal Comm, more particularly a positive bias voltage referenced to the voltage on node 18, in other words, referenced to the same voltage as the output voltage (that is, for example, referenced to ground), and a control current.

Circuit 28 corresponds to a bidirectional switch. In other words, a current may flow through circuit 28 in one direction or in the opposite direction. In other words, a positive current may flow from node 26 to node 18 and a negative current can flow from node 18 to node 26. At least one of the directions, namely the direction from node 26 to node 18 corresponding to a positive current, may be controlled by control signal Comm. Thus, preferably, circuit 28 conducts a positive current from node 26 to node 18 for one or a plurality of first values of the control current and blocks (that is, prevents the flowing of) a negative current for one or a plurality of second values of the control current.

According to an embodiment, the negative current flows whatever is a value of control signal Comm.

According to another embodiment, the negative current is conducted by circuit 28 for a signal Comm having a value among the first value(s), and is blocked by circuit 28 for a signal Comm having a value among the second value(s). In other words, the first value(s) enable the current to flow in both directions, and the second value(s) block the flowing of the current in both directions.

At the starting of operation of the converter, a current peak generally appears in the current flowing through capacitor 22. Such a current peak might cause damage to the components. To limit such a current peak, it is desired to run the current through resistor 24 to attenuate the peak without attenuating the current outside of the peak. Thus, circuit 28 blocks the flowing of the positive current from node 26 to node 18 through the branch comprising circuit 28, and ensures that the current flows through resistor 24. In other words, during the period likely to comprise a current peak, that is, at the starting of the converter, the control current has a value such that a positive current is blocked between the input and the output of circuit 28 and such that said positive current flows through the resistor.

When such a current peak appears at the starting of the converter, the current flows from node 16 to node 18. It is thus generally not useless to block the negative current flowing through circuit 28.

Figure 2:
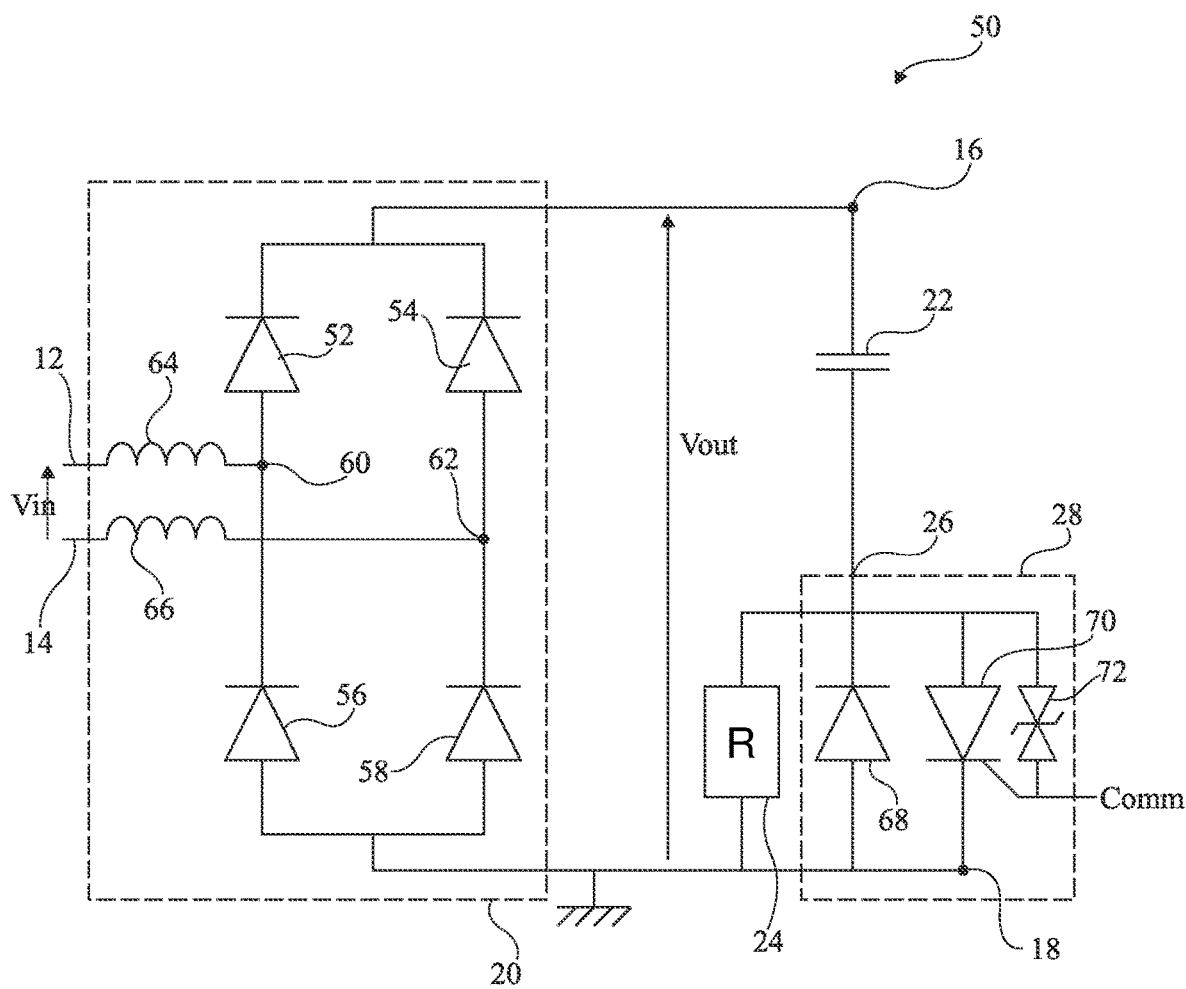
FIG. 2 shows in further detail an embodiment of a voltage converter disclosed herein.

FIG. 2 shows in further detail an embodiment of a voltage converter 50. Converter 50 is an embodiment of the converter 10 of FIG. 1. Thus, converter 50 comprises capacitor 22, circuit 28, and circuit 20, coupled as described in relation with FIG. 1.

Circuit 20 comprises a rectifying bridge. In the example of FIG. 2, the rectifying bridge is a diode rectifying bridge. The rectifying bridge thus comprises four diodes 52, 54, 56, and 58.

Diodes 52 and 56 are series-coupled between node 16 and node 18, that is, between the output nodes, that is, between the nodes of application of output voltage Vout. More particularly, diode 52 is coupled between node 16 and a node 60 and diode 56 is coupled between node 60 and node 18. In other words, the cathode of diode 52 is coupled, preferably connected, to node 16 and the anode of diode 52 is coupled, preferably connected, to node 60. Further, the cathode of diode 56 is coupled, preferably connected, to node 60 and the anode of diode 56 is coupled, preferably connected, to node 18.

Diodes 54 and 58 are series-coupled between node 16 and node 18, that is, between the output nodes, that is, between the nodes of application of output voltage Vout. More particularly, diode 54 is coupled between node 16 and a node 62, and diode 58 is coupled between node 62 and node 18. In other words, the cathode of diode 54 is coupled, preferably connected, to node 16 and the anode of diode 54 is coupled, preferably connected, to node 62. Further, the cathode of diode 58 is coupled, preferably connected, to node 62 and the anode of diode 58 is coupled, preferably connected, to node 18.

Thus, the rectifying bridge comprises two branches coupled in parallel, each branch comprising two diodes coupled in series, diodes 52 and 56 or diodes 54 and 58. The diodes of a same branch are series-coupled so that the cathode of one of the two diodes is coupled, preferably connected, to the anode of the other diode.

As a variant, at least some of diodes 52, 54, 56, and 58 may be replaced with another electronic component enabling forming of a rectifying bridge. For example, at least one of diodes 52, 54, 56, and 58, for example, two of diodes 52, 54, 56, and 58, may be replaced with controllable elements, for example, thyristors or transistors.

Circuit 20, for example, comprises inductances 64 and 66. Inductance 64 is, for example, coupled between node 60 and input node 12. Inductance 66 is, for example, coupled between node 62 and input node 14. More particularly, a terminal of inductance 64 is coupled, preferably connected, to node 60 and the other terminal of inductance 64 is coupled, preferably connected, to node 12. Similarly, a terminal of inductance 66 is coupled, preferably connected, to node 62 and the other terminal of inductance 66 is coupled, preferably connected, to node 14.

Circuit 28 comprises a diode 68. Diode 68 is coupled between node 26 and node 18. Diode 68 is coupled in reverse. In other words, diode 68 is coupled to allow the flowing of a negative current from node 18 to node 26. In other words, the cathode of diode 68 is coupled, preferably connected, to node 26. The anode of diode 68 is coupled, preferably connected, to node 18. Diode 68 is thus coupled in parallel to resistor 24.

Circuit 28 comprises a thyristor 70. Thyristor 70 is coupled between node 26 and node 18. Thyristor 70 is coupled to allow the flowing of a positive current from node 26 to node 18. In other words, the cathode of thyristor 70 is coupled, preferably connected, to node 18. The anode of thyristor 70 is coupled, preferably connected, to node 26. Thyristor 70 is thus coupled in parallel to resistor 24. Thyristor 70 is thus coupled in parallel and head-to-tail with diode 68.

Thyristor 70 is, for example, a cathode-gate thyristor. The thyristor receives on its gate a voltage referenced to node 18. The thyristor gate receives the bias voltage of control signal Comm. The thyristor's gate is thus biased by a positive voltage referenced to node 18. A control current is injected into the gate to determine the on or off state of the thyristor.

At the starting of the converter, a positive current flows from node 26 to node 18. The control current has, at the starting, a value enabling to turn on thyristor 70. Further, diode 68 is non-conductive of the current flowing from node 26 to node 18. The current thus flows through resistor 24, which enables attenuation of the current peak appearing at the starting.

After the starting, that is, after the current peak generated at the starting, the control current takes a value turning on thyristor 70. Thus, during the operation, that is, during the steady state of the converter, the current at least partially, preferably mostly, flows through diode 68 or thyristor 70, according to the direction of the current.

Preferably, circuit 28 comprises a transient voltage suppressor, TSV, circuit 72. Circuit 72 enables avoiding damage that might be caused to the converter by a transient voltage or overvoltage when the system is off, in other words when the capacitor 22 is discharged and the thyristor 70 is blocked, meaning that the thyristor 70 is not receiving a control signal corresponding to an on state. For example, during an overvoltage caused by lightning, a strong current flows through the capacitor 22 and through the resistor 24. Under the effect of this current, the voltage across the terminals of the resistor 24 increases and reaches the threshold voltage of circuit 72. Once this threshold voltage reached, a current flows from node 23 to node 18, through circuit 72, by the triggering of the thyristor 70 and causing of the change of the thyristor to an on state. The thyristor 70, by becoming on, short-circuits the resistor 24 and stops the voltage to reach a critical value for the converter. For example, circuit 72 is a transil diode, for example a unidirectional transil diode. Preferably, circuit 72 is coupled between node 26 and the gate of thyristor 70. A terminal of circuit 72 is for example coupled, preferably connected, to node 26 and another terminal of circuit 72 is for example coupled, preferably connected, to node 18.

Preferably, circuit 72 is configured to form a short-circuit between the gate of thyristor 70 and node 26 if the voltage across thyristor 70 is, for example, greater than 50 V, preferably greater than 100 V, preferably greater than 200 V. Thus, when the voltage across thyristor 70 is greater than the selected threshold, the thyristor receives at its gate the voltage at node 26 and turns on, allowing the dissipation of the current peak in the thyristor, while limiting the voltage to which a circuit powered by the voltage Vout is subjected.

Figure 3:
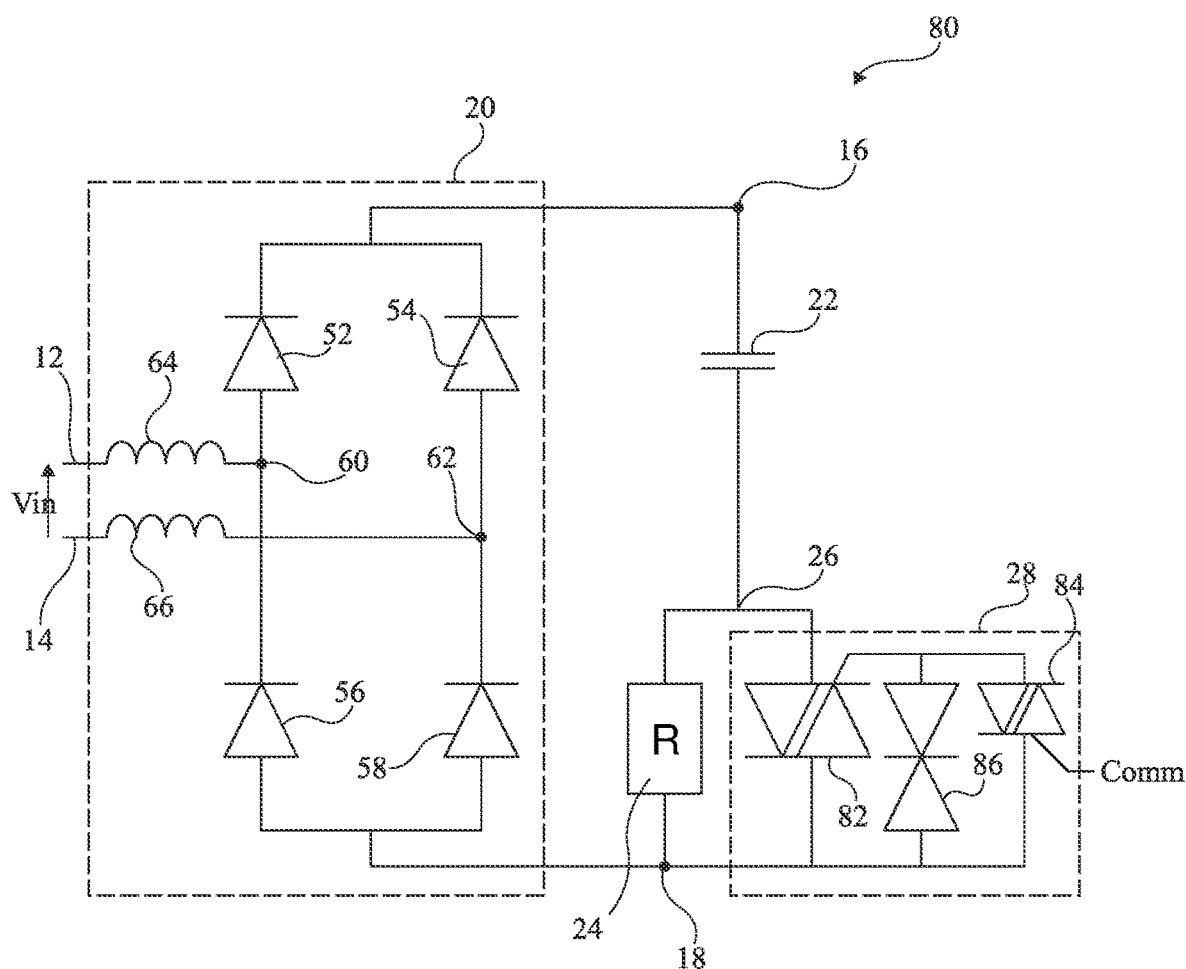
FIG. 3 shows in further detail another embodiment of a voltage converter disclosed herein.

FIG. 3 shows in further detail an embodiment of a voltage converter 80. Converter 80 is an embodiment of the converter 10 of FIG. 1. Thus, converter 80 comprises capacitor 22, circuit 28, and circuit 20, coupled as described in relation with FIG. 1. Circuit 20 comprises, in the example of FIG. 3, the same elements as the circuit 20 described in relation with FIG. 2, coupled in the same way. The circuit 20 of FIG. 3 is thus identical to the circuit 20 of FIG. 2.

Converter 80 of FIG. 3 differs from the converter 50 of FIG. 2 by the composition of circuit 28. The circuit 28 of FIG. 3 comprises a triac 82 coupled between node 26 and node 18. In other words, a terminal of triac 82, preferably the first anode, that is, the anode on the gate side, is coupled, preferably connected, to node 26 and another terminal of triac 82, for example, the second anode, is coupled, preferably connected, to node 18.

Preferably, triac 82 is capable of operating in the first and third quadrants Q1 and Q3. First quadrant Q1 indicates an operating state where the current flows from node 18 to node 26, the voltage on node 18 is greater than the voltage on node 26, and the current in the gate of triac 82 flows towards triac 82. Third quadrant Q3 indicates an operating state where the current flows from node 26 to node 18, the voltage on node 26 is greater than the voltage on node 18, and the current in the gate of triac 82 flows from triac 82.

Triac 82 is preferably capable of withstanding high currents, for example, powers in the range from 500 W to 10 kW under a voltage of 230 V.

Circuit 28 further comprises a triac 84 coupled between the gate of triac 82 and node 18. In other words, a terminal of triac 84, preferably, the first anode, is coupled, preferably connected, to node 18 and another terminal of triac 84, for example, the second anode, is coupled, preferably connected, to the gate of triac 82. Triac 84 receives the control current Comm on its gate to control triac 84. Further, the gate of triac 84 is biased by the bias voltage. Thus, the gate of triac 84 is biased to a positive voltage referenced to node 18.

Preferably, triac 84 is capable of operating in the first and fourth quadrants Q1 and Q4. Fourth quadrant Q4 indicates an operating state where the current flows from node 26 to node 18, the voltage on node 26 is greater than the voltage on node 18, and the current in the gate of triac 84 flows towards triac 84.

At the starting of the converter, a positive current flows from node 26 to node 18. The control current has, at the starting, a value, for example a null value, enabling to turn off triac 84. Triac 82 is thus off. The current thus flows through resistor 24, which enables to decrease the current peak appearing at the starting.

After the starting, that is, after the current peak generated at the starting, the control current takes a value turning on triac 84, and thus turning on triac 82. Thus, during the operation, that is, during the steady state of the converter, the current at least partially flows, preferably mostly, through triac 82.

Preferably, circuit 28 comprises a transient voltage suppressor, TSV, circuit 86. Circuit 86 enables avoiding damage that could be caused to the converter by an overcurrent when the system is off, for example, an over current caused by lightning. For example, circuit 86 is a transil diode. Preferably, circuit 86 is coupled between node 18 and the gate of triac 82. A terminal of circuit 86 is for example coupled, preferably connected, to node 18 and another terminal of circuit 86 is for example coupled, preferably connected, to the gate of triac 82.

Preferably, circuit 86 is configured to form a short-circuit between the gate of triac 82 and node 18 if the voltage across triac 82 is for example greater than 50 V, preferably greater than 100 V, preferably greater than 200 V. Thus, when the voltage across triac 82 is greater than the selected threshold, triac 82 receives on its gate the voltage on node 18 and turns on, allowing the dissipation of the current peak in triac 82.

An advantage of the described embodiments is that they enable attenuation of current peaks in capacitor 22 at the starting of the converter.

An advantage of the described embodiments is that they enable use of a control signal of circuit 28 referenced to the same node as the other voltage already present in the circuit, for example, at the same node as voltage Vout. It is thus not necessary to supply a different auxiliary power and it is possible to use a voltage already present in the device.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

The invention claimed is:

1. A voltage converter delivering an output voltage between a first and a second node, comprising:
   a capacitor series-coupled with a resistor between the first and second nodes; and
   a bidirectional switch coupled in parallel with the resistor, wherein the bidirectional switch is configured to receive at its control terminal a positive bias voltage referenced to the second node;
   wherein the bidirectional switch comprises: a first triac having a first anode coupled to the first node and a second anode coupled to the second node; and a second triac having coupled between a gate of the first triac and the second node, the second triac being controlled by the positive bias voltage.

2. The voltage converter according to claim 1, further comprising a voltage rectifying bridge coupled between the first and second nodes.

3. The voltage converter according to claim 1, wherein a control current is injected into the control terminal of the bidirectional switch, and the bidirectional switch blocks flowing of a positive current from the first node to the second node if the control current has a first value, and the bidirectional switch allows the flowing of the positive current from the first node to the second node if the control current has a second value different than the first value.

4. The voltage converter according to claim 3, wherein a negative current flowing from the second node to the first node is independent from the control current.

5. The voltage converter according to claim 1, wherein a first anode of the second triac is coupled to the second node and a second anode of the second triac is coupled to the gate of the first triac.

6. The voltage converter according to claim 1, wherein the bidirectional switch comprises a transient voltage suppressor circuit coupled between the gate of the first triac and the second node.

7. The voltage converter according to claim 6, wherein the transient voltage suppressor circuit comprises a transil diode.

8. A voltage converter comprising:
   a rectifying bridge having first and second outputs directly electrically connected to first and second nodes, wherein an input voltage is received between first and second inputs of the rectifying bridge;
   a capacitance directly electrically connected between the first node and a third node;
   a resistance directly electrically connected between the third node and the second node; and
   a bidirectional switch directly electrically connected between the third node and the second node, the bidirectional switch having a control terminal, wherein the control terminal receives a control signal, wherein the bidirectional switch comprises:
      a first triac having a first anode directly electrically connected to the third node and a second anode directly electrically connected to the second node, the first triac further having a gate directly electrically connected to a fourth node; and
      a second triac having a first anode directly electrically connected to the gate of the first triac, a second anode directly electrically connected to the second node, the second triac having a gate receiving the control signal.

9. The voltage converter of claim 8, further comprising a transient voltage suppressor circuit directly electrically connected between the fourth node and the second node.

10. The voltage converter of claim 9, wherein the transient voltage suppressor circuit comprises a transil diode.

* * * * *